United States Patent
Fan

(10) Patent No.: US 8,285,119 B2
(45) Date of Patent: Oct. 9, 2012

(54) METHOD FOR PLAYING DIGITAL VIDEOS, A METHOD FOR READING DATA AND A METHOD FOR SMOOTHLY PLAYING PICTURES

(75) Inventor: Yuan-Chang Fan, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 1642 days.

(21) Appl. No.: 11/497,416

(22) Filed: Aug. 2, 2006

(65) Prior Publication Data

US 2007/0041298 A1     Feb. 22, 2007

(30) Foreign Application Priority Data

Aug. 19, 2005 (TW) .............................. 94128451 A

(51) Int. Cl.
H04N 5/94 (2006.01)
H04N 9/88 (2006.01)
H04N 5/92 (2006.01)
H04N 5/93 (2006.01)

(52) U.S. Cl. ........ 386/263; 386/248; 386/264; 386/326; 386/353

(58) Field of Classification Search .............. 386/46, 386/95, 126, 263–277, 239–248, 326–342, 386/353–357
See application file for complete search history.

(56) References Cited

U.S. PATENT DOCUMENTS

| | | | |
|---|---|---|---|
| 6,408,369 B1* | 6/2002 | Garrett et al. .................. | 711/165 |
| 6,496,456 B2* | 12/2002 | Ueki .......................... | 369/47.33 |
| 6,625,755 B1* | 9/2003 | Hirata et al. .................... | 714/17 |
| 6,741,796 B1* | 5/2004 | Heo ................ | 386/95 |
| 2002/0067915 A1* | 6/2002 | Shida et al. .................... | 386/111 |
| 2003/0198459 A1* | 10/2003 | Schiffmann et al. ............ | 386/52 |
| 2003/0206711 A1* | 11/2003 | Berkheimer et al. ........... | 386/46 |
| 2004/0202446 A1* | 10/2004 | Namkoong et al. ............ | 386/46 |
| 2005/0193287 A1* | 9/2005 | Guo et al. ....................... | 714/52 |
| 2006/0227698 A1* | 10/2006 | Kobayashi ................. | 369/275.1 |

* cited by examiner

Primary Examiner — Thai Tran
Assistant Examiner — Hung Dang
(74) Attorney, Agent, or Firm — Muncy, Geissler, Olds & Lowe, PLLC

(57) ABSTRACT

A method for playing digital images is disclosed. The method is applied to a disc player that is electrically connected to a computer, comprises the steps of: reading a disc; judging if the disc has DVD video data; judging that the disc player is in a play mode or in a non-play mode, when the disc has the DVD video data; reading the DVD video data, when the disc player is in the player mode; judging if the read DVD video data are correct; and continuing reading the DVD video data, when the DVD video data are incorrect, wherein when a time for the continuing reading exceeds a pre-set time or self-set terms, the incorrect DVD video data are outputted.

18 Claims, 4 Drawing Sheets

METHOD FOR PLAYING DIGITAL VIDEOS, A METHOD FOR READING DATA AND A METHOD FOR SMOOTHLY PLAYING PICTURES

BACKGROUND OF THE INVENTION (1) Field of the Invention

The invention relates to a method for playing images, and more particularly, to a method for playing images, which method can still smoothly play digital images during playing the video data on a disc through a disc player, if the read DVD video data are not correct.

(2) Description of the Prior Art

The full name of the DVD is "Digital Versatile Disc" which is developed based on CD-ROM. The sizes of both are the same, but because the track pitches of DVD and the spot size on the recording surface are smaller, and the coding rate of DVD data format is higher, the storage capacity is much bigger. The DVD can be used to store various digital files, for example, audios, videos and computer file data. At the very beginning, the DVD was also called "Digital Video Disc", and then now is called "Digital Versatile Disc".

In fact, specifications and applications of the DVD can be widely used, so it is difficult to have a common characteristic. The followings are considered as basic characteristics of the DVD at the very beginning:

1. The video signal uses MPEG 2 compression technology, quality of which is better than that of laser disc, VHS video tape, and the present VCD.
2. The audio signal uses AC-3 of Dobby stereo technology.
3. Single disc can store a whole movie including the video signals and audio signals.
4. In order to match the aforesaid terms, the capacity of single disc is at least 4.7 giga byte which is seven times than that of the CD.
5. Size of the DVD is the same as that of the CD. i.e., 12 cm diameter, and 1.2 mm thick, so that the DVD is compatible, that is, DVD player can read the present various CDs.

Nowadays, the DVD is getting more and more popular, and the data on the DVD have an Error Detection Code (EDC), to judge if the read DVD data are correct or not. Please refer to FIG. 1 which shows a flowchart of the method for playing images in the prior art. On the market, there are disc players which are installed in personal computers or in notebook computers. When DVD video data are read, if there is a mistake checked out by EDC, the disc players will continue trying until correct DVD video data are read.

The method for playing digital movies in the prior art includes the steps of: putting a disc into a disc player (s102); judging if the disc has the DVD video data (s104); reading the DVD video data from a file holder of the DVD video data, if the disc has the DVD video data (s106); stopping the operation, if the disc does not have the DVD video data, and waiting for next operation command (s108); judging if the read DVD video data are correct, after the DVD video data are read (s110), wherein the judgment is made according to the EDC contained in the DVD format data; outputting the DVD video data to the computer if the read DVD data are correct, to let a playing software of the computer play (s112); the disc player continuing reading (that is, repeating the step s112) until the correct video data are read, if the read DVD video data are not correct.

At that time, the playing software of the computer will wait for the DVD video data outputted from the disc player, while the video frame that user can see is still, and control panel of the playing software cannot make any response, because of waiting for the DVD video data, which cause a problem that is very similar to "a shutdown condition".

SUMMARY OF THE INVENTION

It is an object of the present invention to provide a method for playing digital images, which method can smoothly play the DVD movies, and will not cause a shutdown or cause a slow response during playing the DVD movies data on a disc, if the video data read by DVD driver are incorrect.

To achieve aforesaid objects, the method for playing the digital images of the present invention is applied to a disc player, and the disc player is electrically coupled to a computer. The method for playing the digital movies includes putting a disc into the disc player, that is, it is to judge if the disc has the DVD video data. Next, it is to judge that the disc player is in a play mode or a non-play mode, if the disc has the DVD video data. The DVD video data on the disc are read, if the disc player is in the play mode, and it is to judge if the read video data are correct. When it is judged that the read DVD video or audio data are incorrect, then the disc player continues reading the DVD video data, wherein if a time for continuing reading exceeds a pre-set time or satisfies with a self-set terms, then it is allowed to output the incorrect DVD video data, wherein the self-set terms include a data storage amount of the buffer and the error amount of the DVD video data.

The method for playing digital images of the present invention includes the steps of: executing operations of the non-play mode, if the disc player is in the non-play mode, wherein the non-play mode includes reading, in a sequential order, the file data on the disc; judging if the read file data are correct; outputting the file data, when it is judged that the read file data are correct; and continuing reading the file data, and the incorrect file data are not outputted, when it is judged that the file data are incorrect.

In the method for playing digital videos of the present invention, the judgment that the disc player is in the play mode or in the non-play mode is made based on a notification signal that is sent from a playing media of the computer.

In the method for playing digital videos of the present invention, the judgment if the disc player is in the play mode or in the non-play mode is made based on operation commands that are sent from the computer or a tool software, operated by the user.

In the method for playing digital videos of the present invention, the judgment that the disc player is in the play mode or in the non-play mode is made based on a speed of reading the DVD video data, wherein the speed of the non-play mode is faster than that of the play mode.

In the method for playing digital videos of the present invention, it is judged that the DVD video data are outputted when the DVD video data are correct.

In the method for playing digital videos of the present invention, the non-play mode is a copy mode.

In the method for playing digital videos of the present invention, the judgment if the read DVD video data are correct is made based on the EDC of the DVD video data.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1:
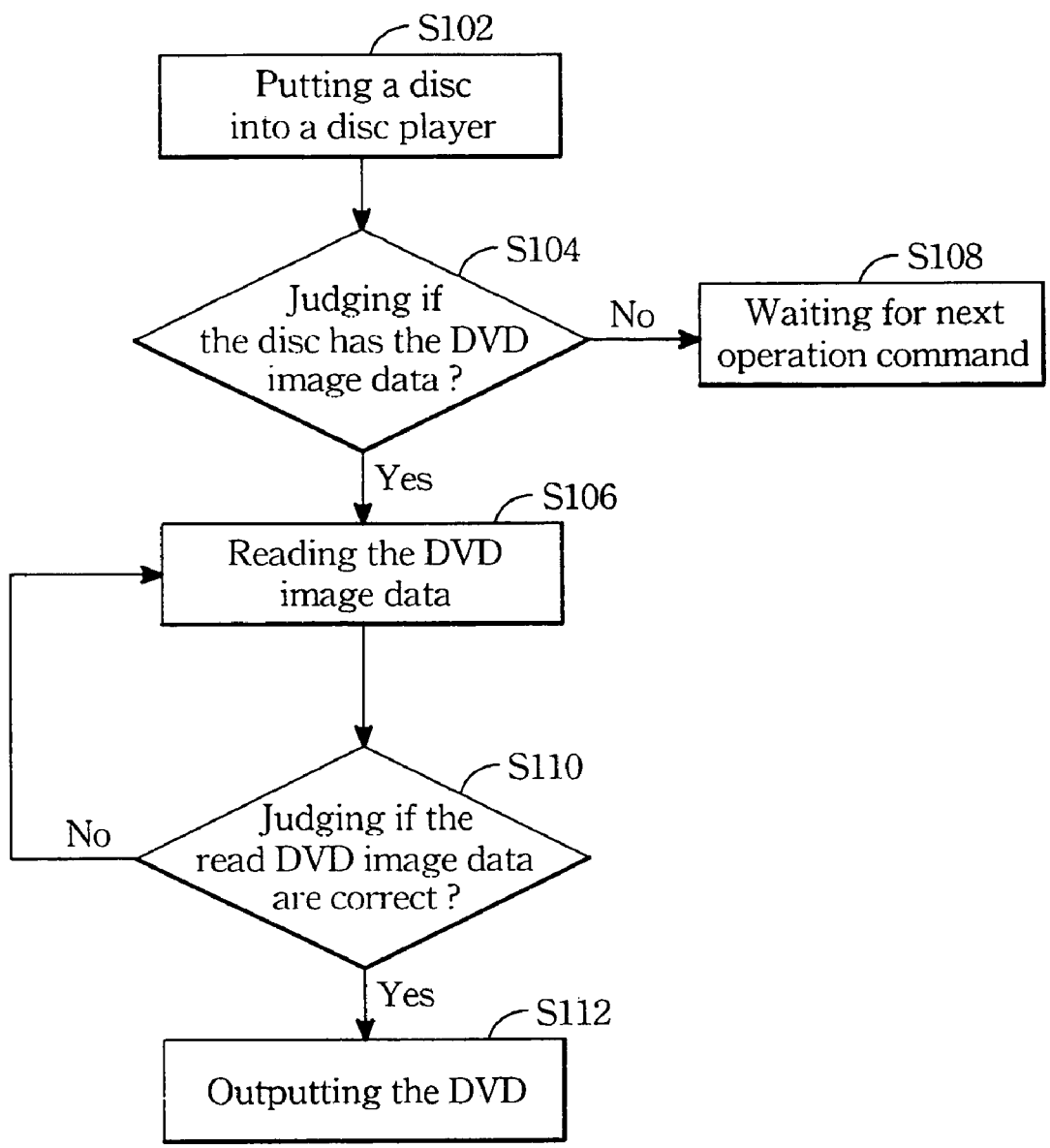
FIG. 1 is a method for playing digital videos in the prior art.
Figure 2:
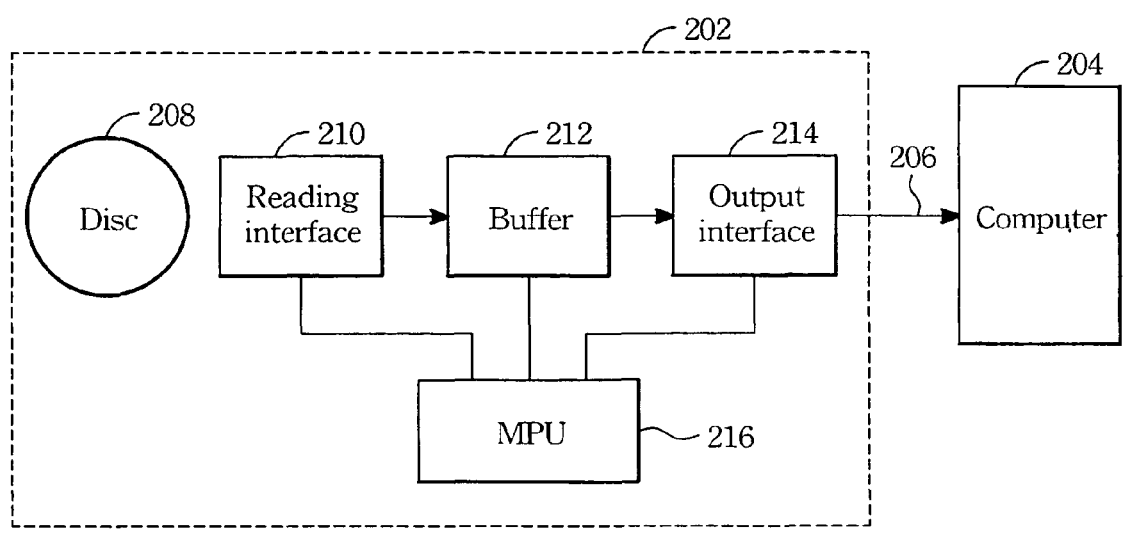
FIG. 2 is a circuit block diagram of a disc player and a computer of the present invention.

Please refer to FIG. 2 which shows a circuit block diagram of the disc player and the computer of the present invention. As shown in FIG. 2, the disc player 202 is electrically coupled to the computer 204 through a connection cable 206, wherein the connection cable 206 can be for example, Integrated Device Electronic (IDE). In the preferred embodiment, it is well-known to the skilled person in the art that the computer 204 can be a desktop computer or a laptop computer, and the disc player 202 can have the functions of reading and copying, but are not limited hereto.

The disc player 202 includes a disc 208, a reading interface 210, a buffer 212, an output interface 214, and a micro processing unit (MPU) 216, wherein the buffer 212 is electrically coupled to the reading interface 210 and the output interface 214, and the MPU 216 is electrically coupled to the reading interface 210, the buffer 212, and the output interface 214. The disc 208 is put into the disc player by the user, and the MPU 216 outputs control signals to the reading interface 210. The reading interface 210 reads the data on the disc 208, wherein the reading interface 210 can be for example, a laser pick-up head.

The buffer 212 temporarily stores the data that are read by the reading interface 210, and outputs the data to the output interface 214. The output interface 214 accesses data to the buffer 212.

The MPU 216 is used to control the reading interface 210, the buffer 212 and the output interface 214, wherein the MPU 216 will monitor the storage level of the buffer 212, so as to control the reading interface 210 to continue reading, and to control the output of the output interface 214.

Figure 3:
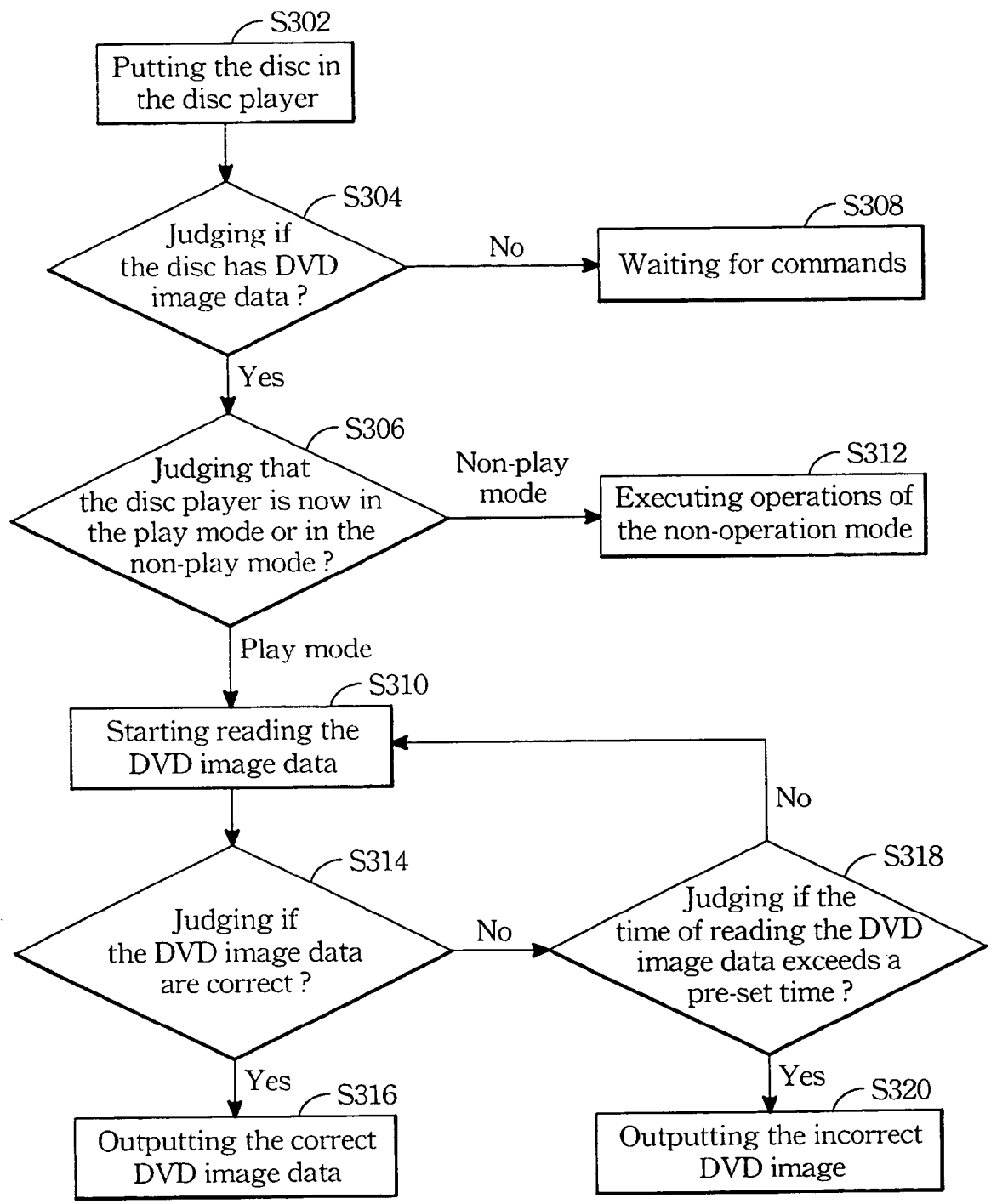
FIG. 3 is a flowchart of the steps of the method for playing digital videos of the present invention.

Please refer to FIGS. 2 and 3, wherein FIG. 3 is a flowchart of the steps of the method for playing digital videos of the present invention. In the preferred embodiment, when the user puts the disc 208 in the disc player 202 (s302), the disc player 202 will search for file structure in specific area on the disc 208, and judge if the disc 208 has DVD video data (s304).

When it is judged that the disc 208 does not have the DVD video data, then the MPU 216 will not output any control signal to any one of the reading interface 210, the buffer 212 and the output interface 214, and remains in a standby status that waits for commands, so that the user can output an operation command through panel of the disc player 202, or keyboard or mouse of the computer 204 (s308).

When it is judged that the disc 208 has the DVD video data, then it will be judged that the disc player is now in the play mode or in the non-play mode, wherein judgment that the disc player 202 is now in the play mode or in the non-play mode is made based on the following three standards:

The first standard is based on a notification signal that is sent by the playing media of the computer 204, that is, the user sends the command through the control panel of the playing media, or the playing media automatically sends an automatic play command. The second standard is based on a control signal that is sent from a tool program of the computer used by the user, to the disc player 202. The third standard is based on a speed of the output interface 214 and buffer 212, which speed is sensed by the MPU 216. It is well-known to the skilled person that the data throughput rate of the output interface 214 is higher in the copy mode, because the computer 204 does not need to proceed with the video data. In contrast, when in the play mode, because the computer 204 needs to proceed with the video data, the computer 204 will request the output interface 214 to output the data at a slower speed. That is, the reading speed of the copy mode is faster than that of the play mode.

After the step (s306), when it is judged that the disc player 202 is in the play mode, then the MPU 216 will send the control signal to the reading interface 210 to make the reading interface 210 start reading the DVD video data (s310); in contrast, when it is judged that the disc player 202 is in the non-play mode, then the MPU 216 will execute operations of the non-operation mode (s312).

When reading the DVD video data, then disc player 202 will judge if the data are correct according to the EDC of the DVD video data (s314). Next, When it is judged that the read DVD video data are correct, then the correct DVD video data are outputted, and are played by the playing software of the computer 204 (s316).

When it is judged that the read DVD video data are incorrect, then the MPU 216 will judge if the time of reading the DVD video data exceeds a pre-set time (s318), wherein the pre-set time can be set up according to, for example, a level of the buffer 212, i.e., the time that the present level of the buffer 212 is changed to zero level or to the minimum level; in other words, the buffer 212 is read by the output interface 214, and is not stored by the reading interface 210.

In the preferred embodiment of the present invention, the minimum level means that as long as the output interface 214 reads once or more, the buffer 212 will be changed to the minimum level of the zero level. Therefore, the pre-set time can be fixed or changeable. If being changeable, the pre-set time can be controlled by the MPU 216.

In the preferred embodiment, when it is judged that not exceeding the pre-set time, the disc player will continue reading the same DVD video data at the same position on the disc 208, and repeats the judgment of step (s314).

When the user watches the DVD images, the user wants a smooth play, so if the DVD images even have little error, as long as range and time of the error are not large and are not long, the user can ignore them. Therefore, when it is judged that exceeding the pre-set time, the incorrect DVD video data are outputted (s320). The present invention can make the judgment according to self-set terms, wherein the self-set terms can include data storage amount of the buffer and error amount of the DVD video data.

Figure 4:
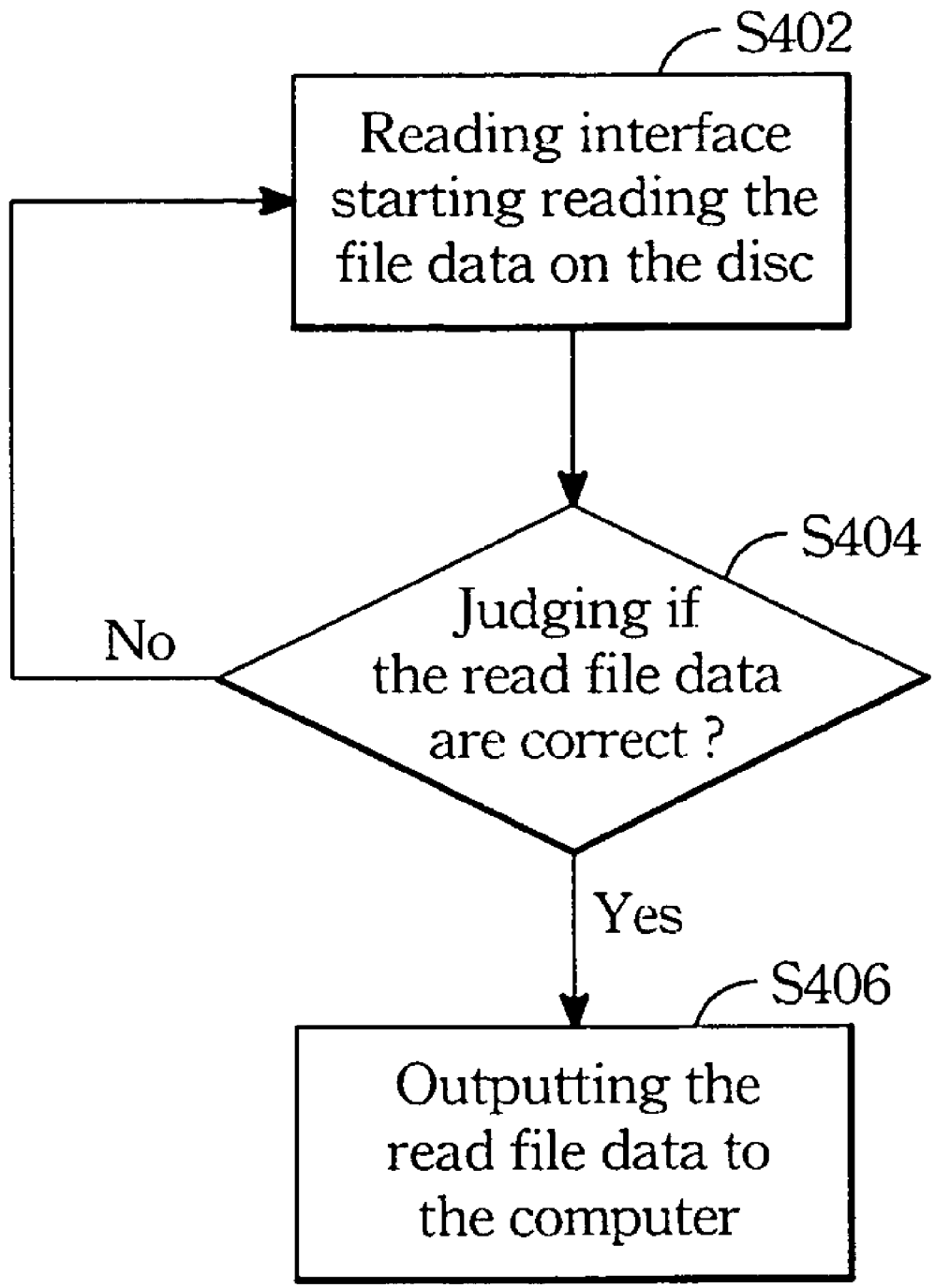
FIG. 4 is a flowchart of the steps of executing a non-play mode of the present invention.

Please refer to FIG. 2 and FIG. 4, the FIG. 4 shows a flowchart of steps of the non-play mode of the present invention. In the preferred embodiment, the non-play mode is taken for example, but in fact, is not limited hereto.

In step (s312) of the preferred embodiment, executing the operations of the non-play mode includes the steps of: the MPU 216 sending the control signal to the reading interface 210 to make the reading interface 210 start reading the file data on the disc 208 (s402), wherein the file data can be, for example, various file data that can be applied to or executed in the computer 204; judging if the read file data are correct (s404), wherein as above-mentioned, the judgment is made based on the EDC of the DVD format data to judge if the data are correct; and outputting the read file data to the computer 204, when it is judged that the read file data are correct (s406), and in contrast, continuing reading the same DVD video data at the same position on the disc 208, and repeating the judgment of step (s404), when it is judged that the read file data are incorrect.

The preferred embodiment of the present invention further includes that when repeating step (s402), a maximum allowable time is set up, that is, the maximum allowable time is the time for repeating reading the same file data, and when exceeding the maximum allowable time, the user is advised through the computer 204 that the correct file data cannot be read.

In the preferred embodiment of the present invention, partial steps or all steps of the method for playing digital images can be applied to read the data on the DVD disc.

Summing up the above, the method for playing digital videos, method for reading data and method for smoothly playing videos have the following advantages:
(1) It can be judged that the disc player is in the play mode or in non-play mode, and further determines if the incorrect DVD data are outputted
(2) When the computer plays the DVD video data, the computer can prevent the play panel of the playing software from being in a crash status, because of unable to read the data.

While the present invention has been particularly shown and described with reference to a preferred embodiment, it will be understood by those skilled in the art that various changes in form and detail may be without departing from the spirit and scope of the present invention.

What is claimed is:

1. A method for playing digital videos, which method is applied to a disc player that is electrically connected to a computer, the method comprising the steps of:
    reading a disc;
    judging if the disc has DVD video data;
    according to one speed of reading said DVD video data, judging that the disc player is in a play mode, and according to another speed of reading said DVD video data, judging that the disc player is in a non-play mode;
    reading said DVD video data, when the disc player is in said play mode;
    judging if said DVD video data are correct; and
    continuing reading the DVD video data, when said DVD video data are incorrect, wherein when a time for continuing reading exceeds a pre-set time or self-set terms, incorrect said DVD video data are outputted.

2. The method according to claim 1, wherein said self-set terms include a data storage amount in a buffer of said disc player and an error amount of said DVD video data.

3. The method according to claim 1 further comprising a step of:
    executing operations of said non-play mode, when said disc player is in said non-play mode.

4. The method according to claim 3, wherein executing operations of said non-play mode comprises steps of:
    reading a plurality of file data on said disc;
    judging if said file data are correct;
    outputting said file data, when said file data are correct; and
    continuing reading said file data, when said file data are incorrect.

5. The method according to claim 1, wherein judging that said disc player is in said play mode or in said non-play mode is further made according to a notification signal sent from a computer.

6. The method according to claim 1, wherein judging that said disc player is in said play mode or in said non-play mode is further made according to an operation command that is sent from said computer operated by a user, to said disc player.

7. The method according to claim 1, wherein when it is judged that said DVD video data are correct, said DVD video data are outputted.

8. The method according to claim 1, wherein deciding if said DVD video data are correct is made based on an Error Detection Code of the DVD video data.

9. The method according to claim 1, wherein said non-play mode includes a copy mode.

10. The method according to claim 1, wherein when it is judged that said disc does not have said DVD video data, said disc player waits for said operation command from said computer.

11. The method according to claim 10, wherein executing said operations of said non-play mode comprises steps of:
    reading said file data on the disc;
    judging if said read file are correct;
    outputting said file data, when it is judged that said file data are correct; and
    continuing reading said file data, when it is judged that said file data are incorrect.

12. A method for smoothly playing pictures, which method is applied to a disc player that reads DVD video data on a disc, and outputs said DVD video data to a computer to play, the method comprising steps of:
    according to one speed of reading said DVD video data, judging that the disc player is in a play mode, and according to another speed of reading said DVD video data, judging that the disc player is in a non-play mode;
    reading said DVD video data, when it is judged that said disc player is in said play mode;
    judging if said DVD video data are correct; and continuing reading said DVD video data, when said DVD video data are incorrect, wherein when a time for continuing reading exceeds a pre-set time or self-set terms, incorrect said DVD video data are outputted.

13. The method according to claim 12, wherein said self-set terms include data storage amount of said buffer and error amount of said DVD video data.

14. The method according to claim 12, wherein judging that said disc player is in said play mode or in said non-play mode is made further based on a notification signal that is sent from a computer.

15. The method according to claim 12, wherein judging that said disc player is in said play mode or in said non-play mode is made further based on an operation command that is sent from said computer.

16. The method according to claim 12, wherein the speed of reading said DVD video data in said non-play mode is faster than that in said play mode.

17. The method according to claim 12, wherein when it is judged that said DVD video data are correct, the DVD video data are outputted.

18. The method according to claim 12, wherein judging if said read DVD video data are corrected is made further based on an Error Detection Code of said DVD video data.

* * * * *